United States Patent [19]

Ramus et al.

[11] Patent Number: 4,725,710
[45] Date of Patent: Feb. 16, 1988

[54] ELECTRICALLY HEATABLE VISION UNIT

[75] Inventors: Kevin J. Ramus, Dearborn; Patricia B. Reid, Detroit; Robert F. Tweadey, Farmington, all of Mich.

[73] Assignee: Ford Motor Company, Dearborn, Mich.

[21] Appl. No.: 795,804

[22] Filed: Nov. 7, 1985

[51] Int. Cl.$^4$ .................. H05B 3/00; H01C 7/00; E06B 7/12
[52] U.S. Cl. .................... 219/203; 52/171; 219/345; 219/522; 219/541; 219/543; 219/547; 338/308; 338/309
[58] Field of Search ............... 219/203, 522, 543, 547, 219/345, 541; 338/308, 309; 52/170, 171

[56] References Cited

U.S. PATENT DOCUMENTS

| 3,313,920 | 4/1967 | Gallez | 219/203 X |
| 3,475,588 | 10/1969 | McMaster | 219/543 X |
| 3,621,441 | 11/1971 | Hudnall et al. | 338/309 X |
| 4,385,226 | 5/1983 | Sauer | 338/309 X |
| 4,388,522 | 6/1983 | Boaz | 338/309 X |
| 4,543,466 | 9/1985 | Ramus | 219/203 |

FOREIGN PATENT DOCUMENTS

| 2000655 | 1/1973 | Fed. Rep. of Germany | 219/547 |
| 2043409 | 10/1980 | United Kingdom | 219/522 |

Primary Examiner—Anthony Bartis
Attorney, Agent, or Firm—William E. Johnson; Clifford L. Sadler

[57] ABSTRACT

An improved electrically heated vision unit in which heat can be concentrated in a selected zone or zones thereof includes at least one sheet of a relatively rigid transparent material (12) having a ceramic enamel (14) extending along at least two opposite edges on one surface thereof. A bus bar is associated with each ceramic enamel on each edge of the sheet and has at least one narrow portion (18) overlying and bonded to an associated one of the ceramic enamel, and at least one wide portion (20) in part overlying and bonded to an associated one of said ceramic enamel and in part overlying and bonded to said one surface of the transparent material. The narrow portions and the wide portions of the pair of bus bars are in register with like portions on an opposed one of the bus bars. An electrically conductive transparent coating (22) of generally uniform thickness and composition extends between the pair of bus bars with sections thereof between juxtaposed wide portions of the pair of bus bars being bonded only to the wide portions of the bus bars and the one surface of the transparent material, and with other sections thereof between juxtaposed narrow portions of the pair of bus bars being bonded to the narrow portions of the bus bars, the ceramic enamel and the one surface of the transparent material. Structure is provided for supplying electrical energy to the bus bars and through the conductive coating.

6 Claims, 5 Drawing Figures

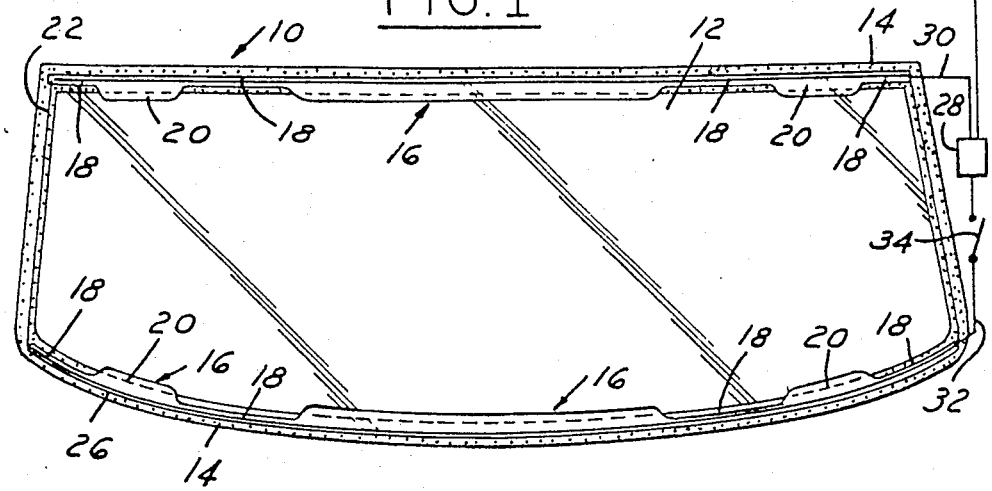
FIG. 1
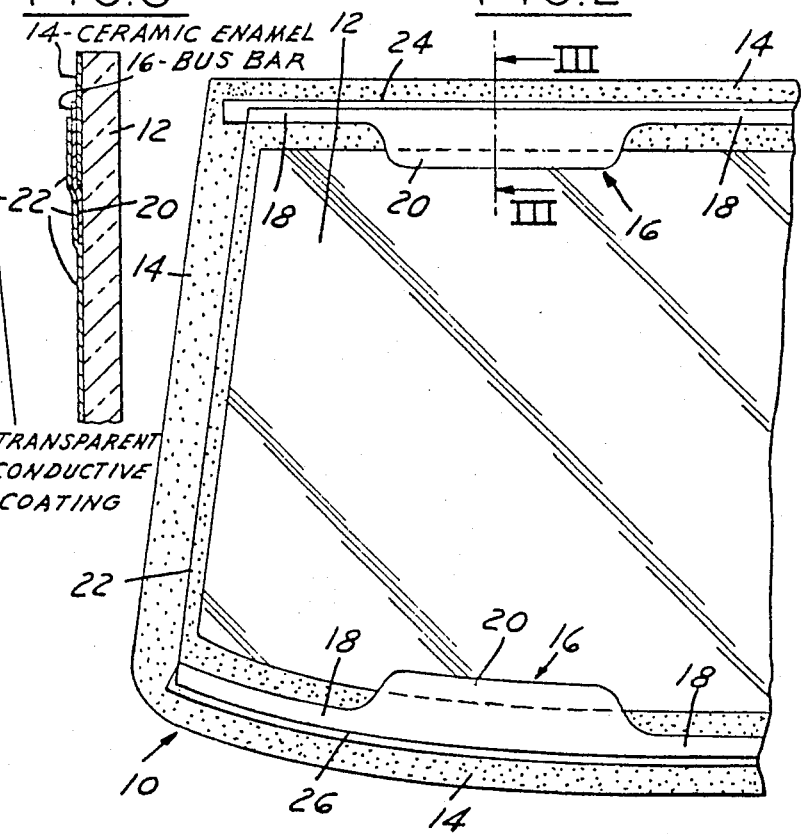
FIG. 3
14 - CERAMIC ENAMEL
16 - BUS BAR
TRANSPARENT CONDUCTIVE COATING
FIG. 2

ELECTRICALLY HEATABLE VISION UNIT

TECHNICAL FIELD

This application is directed to an electrically heated vision unit in which heat can be concentrated in a selected zone or zones thereof. The vision unit may be an electrically heated windshield which finds principal use as the windshield vision unit of a vehicle such as a motor vehicle. This vision unit is one which may be defogged and deiced in a selected zone or zones thereof by application of an electric current to an electrically conductive coating on or in the vision unit. Generally, the electrically conductive coating, which covers most of a windshield surface is transparent to radiation in the visible wavelength range.

BACKGROUND AND PRIOR ART STATEMENT

Motor vehicles, as presently manufactured, are equipped with systems for defogging and deicing windshields. Generally, these systems depend upon heat generated in the internal combustion engine and transferred to the engine's cooling system to be blown as warm air across the interior of the windshield to accomplish the defogging and deicing. In such a case, of course, it is readily apparent that there is a period of time between the starting of an engine and the time that sufficient heat is being generated in its cooling system in order to provide a defogging and deicing of the vehicle's windshield. Depending upon the exact temperature conditions and the time the vehicle has been sitting idle without its engine running, the period of time before sufficient heat is available to accomplish this function can be up to 10 minutes or more.

In view of the fact that there can be a rather lengthy delay before the present day motor vehicles heating and defrosting system can clear a windshield, automotive designers have been attempting to design systems which generate heat from electrical energy to accomplish a relatively rapid defrost and deicing of a vehicle windshield. Designers have also been attempting to design such an electrically heated vision unit in which heat can be concentrated in a selected zone or zones thereof which will initially be defogged and deiced. For example, areas desired to be more rapidly defogged and deiced may be those located directly in front of the driver and at opposite edges of the vision unit if such a vision unit is a windshield. Such rapid defrosting and deicing systems utilizing electrical energy generally are independent of the normal heating and defrosting system contained in a motor vehicle.

Many different systems have been proposed for accomplishing this rapid defrost and deicing function, including the placement of an electrically conductive transparent coating on the windshield and embedding of fine wires in a laminating interlayer of the windshield. To the best of our knowledge, there are no such rapid defrost and deicing system in vehicles which are currently sold in the U.S. market. We believe this is because of the relatively high cost of such systems and also because of the electrical problems associated with installment of such a system on a vehicle windshield such as found in today's automobiles. The windshield found in today's automobile is generally of trapezoidal shape. By this we mean the modern day windshield is smaller in length dimension at the top thereof than at the bottom thereof. The top dimension of the windshield is reduced because the aerodynamic styling of motor vehicles dictates such a configuration for the windshield to fit on the rounded body shapes now being manufactured.

One of the inventors of the subject matter of this disclosure, namely, Kevin J. Ramus, has issued on Sept. 24, 1985, U.S. Pat. No. 4,543,466, entitled "Bus Bar Arrangement for Uniformly Heating a Trapezoidally Shaped Electrically Heated Windshield." Briefly, this patent proposes a system for applying a generally uniform heating of a trapezoidally shaped electrically heated windshield.

In particular, the patent discloses an electrically heated windshield of generally trapezoidal shape having bus bars of uniform conductivity throughout their length extending in line contact with the upper and lower edges of a continuous uniformly thick trapezoidally shaped electrically conductive coating provided on the windshield surface. This construction is used for deicing and defrosting the windshield. The line of contact of the upper bus bar with the conductive coating has a length generally equal to the entire effective length of the upper edge of the conductive coating. The lower bus bar is symmetrically located along the lower edge of the conductive coating and has a line of contact length equal to the sum of the length of the upper bus bar plus generally about one-half of the difference between the entire effective length of the lower edge of the conductive coating minus the length of the line of contact of the upper bus bar. This structure, however, does not teach an electrically heatable vision unit in which heat can be concentrated in a selected zone or zones thereof as is taught in the specification.

Mr. Ramus also personally conducted a search in the U.S. Patent and Trademark Office to determine if the electrically heatable vision unit as taught in this specification was novel. During his search, he uncovered only one patent which was felt to be of interest with respect to the subject matter of this specification. The patent uncovered was U.S. Pat. No. 3,621,441, which issued on Nov. 16, 1971, for "Film Resistor Adjustable by Isolating Portions of the Film."

This patent teaches a film resistor which includes a pair of conductive bus bars which are spaced apart from each other and are deposited adjacent to opposite edges of one surface of a substrate. A plurality of spaced parallel fingers extend transversely from each of the conductive bus bars and partially into the space between the conductive bus bars on the substrate. A resistive film is deposited onto the substrate in the space between the conductive films and overlaps the free ends of the fingers. The resistance value of the film resistor can be adjusted by removing selectively some or all of the fingers so that adjacent portions of the resistive film are substantially isolated electrically when the resistor is used in an environmental circuit even though the entire resistive film remains attached physically to the substrate and unmarred. From the following specification, it will be obvious that this structure is different than our structure proposed for an improved electrically heatable vision unit in which heat can be concentrated in a selected zone or zones thereof.

DISCLOSURE OF INVENTION

This invention is directed to an improved electrically heatable vision unit and, more particularly, to an improved electrically heatable vision unit in which heat can be concentrated in a selected zone or zones thereof.

The improved vision unit is most desirably a windshield for an automobile.

In accordance with the teachings of our improved electrically heatable vision unit, there is provided a transparent vision unit including at least one sheet of a relatively rigid transparent material. A ceramic enamel is bonded to and extends along at least two opposite edges on one surface of the transparent material. If the vision unit is a windshield, generally the opposite edges are the upper and lower edges of the transparent material as these are the longest edges of the windshield.

A pair of electrically conductive bus bars are provided. A single bus bar is associated with the ceramic enamel on each edge of the transparent material. Each of the bus bars has (i) at least one narrow portion overlying and bonded to an associated one of the ceramic enamel and (ii) at least one wide portion in part overlying and bonded to an associated one of the ceramic enamel and in part overlying and bonded to the one surface of the transparent material, the narrow portions and the wide portions of the pair of bus bars being in register with like portions on opposite ones of the bus bars. By "in register" we mean that narrow portions and wide portions of the pair of bus bars are generally placed on opposite edges of the glass sheet in facing relationship to one another, generally extending along about the same length as the opposed portion as will be explained in greater detail hereinbelow.

An electrically conductive coating is provided. This electrically conductive coating extends between the pair of bus bars. Sections of the electrically conductive coating between juxtaposed wide portions of the pair of bus bars being bonded only to the wide portions of the bus bars and the one surface of the transparent material. On the other hand, other sections of the electrically conductive coating extending between juxtaposed narrow portions of the pair of bus bars are bonded to the narrow portions of the bus bars, the ceramic enamel, and the one surface of the transparent material. In this manner, the juxtaposed wide portions of the bus bars can carry more current therebetween, thereby concentrating more heat in the zone of the vision unit therebetween.

Structure is provided for supplying electrical energy to the bus bars. In this manner, electrical energy can flow through the electrically conductive coating existing between the bus bars. Because of the structure of our invention, the flow of electrical energy will be concentrated between juxtaposed wide portions of the bus bars whereby zones between such bus bars will be heated more rapidly than zones between juxtaposed narrow portions of the bus bars.

The structure disclosed above may be used to concentrate heat in a selected zone or zones of an electrically heated vision unit. For example, if the vision unit is a windshield for a motor vehicle, the heat may be concentrated in front of the driver and at the opposite edges of the vision unit. Any other heating pattern desired to a windshield designer or vision unit designer may also be utilized.

BRIEF DESCRIPTION OF THE DRAWINGS

The novel features that are considered characteristic of the invention are set forth with particularity in the appended claims. The invention itself, however, both as to its organization and its method of operation, together with additional objects and advantages thereof, will best be understood from the following description of specific embodiments when read in connection with the accompanying drawing, wherein like reference characters indicate like parts throughout the several figures, and in which:

FIG. 1 is an elevational view of a heatable vision unit such as a windshield in which the structure of this invention is shown schematically;

FIG. 2 is an enlarged section taken on the left side of FIG. 1, also in elevation, showing in greater detail the structure of this invention;

FIG. 3 is a cross-section view in elevation taken along line III—III of FIG. 2, also showing in greater detail the structure of this invention;

BEST MODE AND INDUSTRIAL APPLICABILITY

Figure 4:
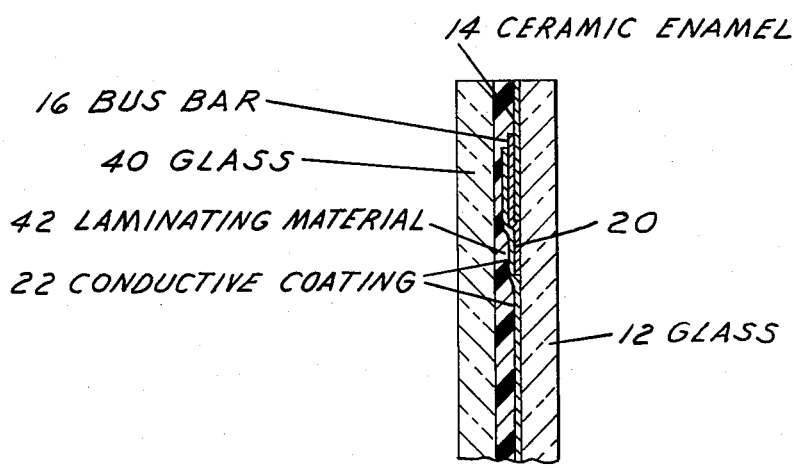
FIG. 4 is a cross-sectional view in elevation showing an alternate construction of the structure of this invention in which a laminated windshield is formed.

The following description is what we consider to be a preferred embodiment of an improved electrically heatable vision unit of our inventive construction. The following description also sets forth what we now contemplate to be the best mode of construction of our inventive electrically heatable vision unit. The description is not intended to be a limitation upon the broader principles of this construction, and while preferred materials are used to form the construction in accordance with the requirements of the laws, it does not mean that other materials cannot be used to make this construction.

There are several known way of making a vision unit such as a windshield for a motor vehicle. Such a windshield may be constructed on a single sheet of tempered glass as is done in Europe. In the United States, windshields are constructed by laminating two glass sheets together with an interlayer of a suitable laminating plastic material. Newly introduced windshields include a sheet of glass having a soft film along the interior portion thereof. All of these types of constructions are amenable to our improved electrically heatable vision unit. In other words, our proposed structure can be used with single-ply laminated and single-ply plastic film windshields or other vision units. For the sake of simplicity, this specification will disclose an improved electrically heated vision unit in which a single-ply of tempered glass is the vision unit.

Reference is now made to FIG. 1, wherein an improved electrically heatable vision unit, such as a windshield, is generally designated by the numeral 10. The structure we are disclosing in this specification is one which allows the concentration of heat from the electrically heatable vision unit in a selected zone or zones. In the preferred embodiment desired herein, the heat will be concentrated in three zones of the windshield. The three zones selected are the right and left sections of the windshield and the central section thereof. The exact manner in which the concentration of heating is carried out will be described in greater detail hereinbelow.

The transparent vision unit 10 includes, in the preferred embodiment, a sheet of tempered transparent glass 12. While glass is the preferred substrate, suitable rigid plastic material such as polycarbonate material may also be a satisfactory substrate.

A ceramic enamel 14 is bonded to and extends along at least two opposite edges on one surface of the glass sheet 12. In accordance with the broad teachings of this invention, the ceramic enamel 14 needs extend along only two edges of the glass sheet 12, normally the two edges having the longest length dimension. However, in accordance with the teachings of the preferred embodiment, the ceramic enamel 14 extends around the entire perimeter of the glass sheet 12.

Normally, this ceramic enamel 14 is dark in color and opaque. The ceramic enamel is applied around the perimeter of the glass sheet 12 so that when that glass sheet is installed in a vehicle, one's vision is blocked with respect to seeing the area adjacent the perimeter of the glass which generally would contain retaining clips and other materials, the sight of which is not desired from the exterior of the vehicle. The ceramic enamel has a generally relatively rough surface and has pinholes therein. Ceramic materials that are suitable for the ceramic enamel contain Fe, Mn, Co and Cr as the colorants and lead borosilicate glass frit. Such a ceramic material is suspended in an organic medium and applied by a silk screen printing method well known to those skilled in the art. The ceramic enamel is then prefired to bond it to the glass sheet.

A pair of bus bars, generally identified by the numeral 16—16, is provided, one associated with the ceramic enamel 14 on the top edge of the glass sheet 12 and one associated with the ceramic enamel 14 on the bottom edge of the glass sheet 12. Each of the bus bars 16—16 have narrow portions 18—18 overlying and bonded to an associated area of the ceramic enamel 14. Each of the bus bars 16—16 also has wide portions 20—20 overlying and bonded to an associated one of the ceramic enamel 14 and in part overlying and bonded to the surface of the glass sheet 12, as best seen in FIG. 3.

The bus bars 16—16 are generally made from a silver ceramic material as known in the art. The bus bars formed of this material are applied to the surface of the ceramic enamel 14—14 and in part to the one surface of the glass sheet 12 by a silk screen printing operation. Normally, the bus bars are printed and the printing material used is liquid. The liquid material is then dried in a suitable dryer so that the final bus bars 16—16 are bonded to the associated surfaces of the ceramic enamel 14 and the one surface of the glass sheet 12.

As is best seen in FIG. 2, the narrow portions 18—18 and the wide portions 20—20 of the pair of bus bars 16—16 are in register with like portions on an opposed one of the bus bars. In particular, for example, as seen in FIG. 2, the wide portions 20—20, respectively, of the upper bus bar 16 and the lower bus bar 16, are generally in facing relationship to one another from opposite edges of the glass sheet 12. Also, the wide portions 20—20 are of about the same length. In a similar manner, the narrow portions 18—18 of the upper bus bar 16 and lower bus bar 16 are in facing relationship and about the same relative length. The purpose of having the narrow portions 18—18 and wide portions 20—20 will be explained in greater detail hereinbelow.

In this specification, the wording "about the same relative length", as used to describe the narrow portions and the wide portions of the bus bars, will have the following meaning. If the windshield is generally rectangular in configuration, then the upper and lower edges thereof will be of equal length and the narrow and wide portions of the bus bars will be of the same length as the length of juxtaposed portions of the bus bar. If the windshield is of trapezoidal shape, then the lengths of juxtaposed portions of the bus bars will be in a ratio to one another as the ratio of the shorter side of the trapezoidal windshield is to its longer side.

An electrically conductive transparent coating 22 is provided which extends in a uniform thickness from an upper edge 24 thereof to a lower edge 26 (seen only in FIG. 2) between the bus bars 16—16. The conductive coating 22 may be applied, for example, by a magnetron sputtering operation. Magnetron sputtering of glass surfaces is well known in the art. In accordance with the teachings of a preferred embodiment of this invention, the materials used as target materials in the magnetron sputtering device are zinc and silver, and the resulting coating applied to the windshield is a multilayer coating consisting of zinc oxide, and silver and zinc oxide which form a coating which is electrically conductive. By electrically conductive we mean that electric current, either AC or DC can be passed across the silver containing coating.

As best seen in FIG. 2, sections of the electrically conductive coating 22 between juxtaposed wide portions 20—20 of the pair of bus bars 16—16 are bonded only to the wide portions of the bus bars and the surface of the glass sheet 12. Between juxtaposed wide portions 20—20 of the pair of bus bars 16—16, there is no contact of the conductive coating 22 with any of the ceramic enamel 14.

On the other hand, sections of the electrically conductive coating 22 between juxtaposed narrow portions 18—18 of the bus bars 16—16 are bonded to the narrow portions 18—18 of the bus bars, portions of the ceramic enamel 14, and the one surface of the glass sheet 12. Since the conductive coating between juxtaposed narrow portions of the bus bars also passes over the rough and sometime pinholed exposed surface of the ceramic enamel 14, the resistance of the conductive coating across such area is increased and less of the energy flows therethrough. This means that the flow of energy between the bus bars 16—16 is concentrated to a certain extent in the areas between juxtaposed wide portions 20—20 of the bus bars 16—16, thereby concentrating more heat in the zone or zones of the vision unit between such wide portions 20—20. The amount of heat to be concentrated in such zones can be controlled by the relative length of those zones in comparison with the relative lengths of the narrow zones as well as by the roughness of the ceramic enamel 14. In most cases the wide zones extend ¼ inch beyond the associated edge of the ceramic coating 14. However, the extension may be limited to 1/16 or 1/32 inch, if that is desired.

In FIG. 1, an electric current source such as an automobile's alternator 28, suitable electric wires 30 and 32, and switch 34 are schematically illustrated. When switch 34 is closed, electrical energy is applied from alternator 28 to the bus bars 16—16 by means of the electrical wires 30 and 32 and through the conductive coating 22 in order to carry out a heating of the glass sheet 12. Because of the construction described above, the heated windshield will have three zones in which electrical energy will be concentrated, they being the three zones in which the wide portions 20—20 of the bus bars 16—16 are in register with one another. These zones will defrost and/or deice more rapidly than the zones having narrow portions 18—18 of the bus bars 16—16 in register.

In FIG. 4 a structure similar to FIG. 3 is disclosed. The difference in this construction is that a second glass sheet 40 is bonded by means of a plastic interlayer 42 to the structure which was shown in FIG. 3 in order to make a windshield of laminated construction.

Figure 5:
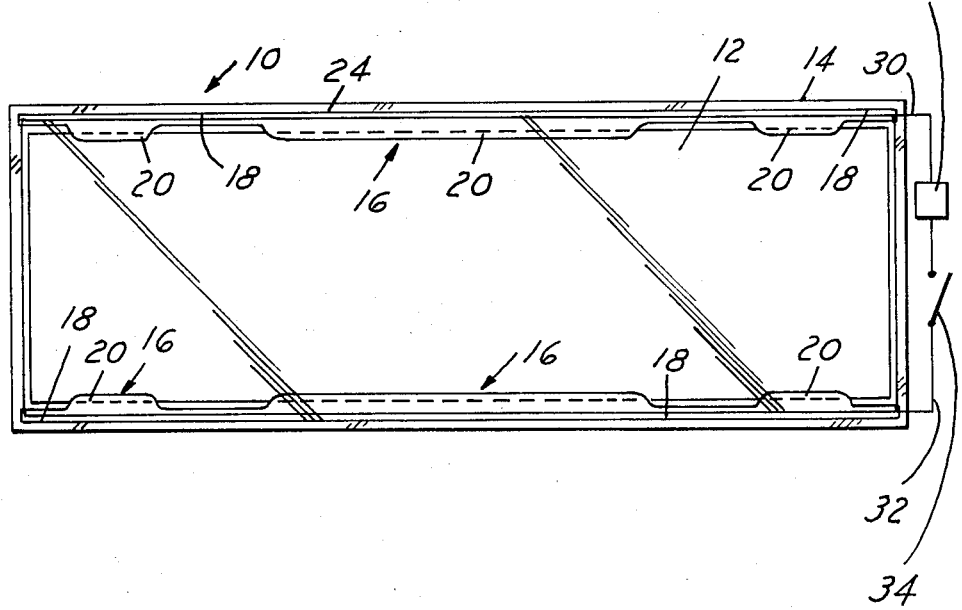
FIG. 5, is an elevation view similar to FIG. 1 of a heatable vision unit such as a windshield in which the windshield is of rectangular configuration.

FIG. 5 is a windshield construction such as shown in FIG. 1 with like parts identified by like numerals. In this case, however, the tempered transparent glass 12 is rectangular in configuration and juxtaposed narrow portions 18—18 and wide portions 20—20 are of equal lengths.

While particular embodiments of the invention have been illustrated and described, it will be obvious to those skilled in the art that various changes and modifications may be made without departing from the invention, and it is intended to cover in the appended claims all such modifications and equivalents as fall within the true spirit and scope of this invention.

We claim:

1. An improved electrically heatable vision unit in which heat can be concentrated in a selected zone or zones thereof, which comprises:
   a transparent vision unit including at least one sheet of a relatively rigid transparent material;
   a ceramic enamel bonded to and extending along at least two opposite edges on one surface of said transparent material;
   a pair of electrically conductive bus bars, one associated with said ceramic enamel on each edge of said transparent material, each of said bus bars having (i) at least one narrow portion overlying and bonded to an associated one of said ceramic enamel at a position spaced inwardly from an edge of said associated one of said ceramic enamel which is located across from an edge of said other associated one of said ceramic enamel, and (ii) at least one wide portion in part overlying and bonded to an associated one of said ceramic enamel and in part overlying and bonded to said one surface of said transparent material, said narrow portions and said wide portions of said pair of bus bars being in register with like portions on an opposed one of said bus bars;
   a transparent electrically conductive coating of generally uniform thickness and composition extending between said pair of bus bars, sections of said electrically conductive coating between juxtaposed wide portions of said pair of bus bars being bonded only to said wide portions of said bus bars and said one surface of said transparent material, while other sections of said electrically conductive coating between juxtaposed narrow portions of said pair of bus bars being bonded to said narrow portions of said pair of bus bars, said ceramic enamel, and said one surface of said transparent material, whereby said juxtaposed wide portions of said bus bars carry more current therebetween thereby concentrating more heat in the zone of the vision unit therebetween; and
   means for supplying electrical energy to said bus bars so that electrical energy can flow through said electrically conductive coating extending between said bus bars.

2. The vision unit of claim 1, wherein said sheet of relatively rigid transparent material is a sheet of glass.

3. The vision unit of claim 1, wherein said sheet of relatively rigid transparent material is one of a pair of glass sheets forming a laminated windshield.

4. The vision unit of claim 1, wherein said ceramic enamel extends around the entire perimeter of the relatively rigid transparent material.

5. The vision unit of claim 1, wherein said relatively rigid transparent material is rectangular in configuration and said juxtaposed portions of said pair of bus bars are of equal lengths.

6. The vision unit of claim 1, wherein said relatively rigid transparent material is trapezoidal in configuration and the length of said juxtaposed portions of said pair of bus bars are in a ratio to one another as the ratio of the shorter side of said trapezoidal transparent material is to its longer side.

* * * * *